(12) United States Patent
Shinohara

(10) Patent No.: US 11,485,017 B2
(45) Date of Patent: Nov. 1, 2022

(54) ROBOT SYSTEM

(71) Applicant: FANUC CORPORATION, Yamanashi (JP)

(72) Inventor: Naruki Shinohara, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 213 days.

(21) Appl. No.: 17/088,964

(22) Filed: Nov. 4, 2020

(65) Prior Publication Data
US 2021/0154847 A1    May 27, 2021

(30) Foreign Application Priority Data
Nov. 27, 2019  (JP) .............................. JP2019-214445

(51) Int. Cl.
*B25J 13/00* (2006.01)
*B25J 9/16* (2006.01)
*B25J 9/00* (2006.01)
*B25J 13/08* (2006.01)

(52) U.S. Cl.
CPC ........... *B25J 9/1674* (2013.01); *B25J 9/0084* (2013.01); *B25J 13/006* (2013.01); *B25J 13/086* (2013.01); *B25J 13/088* (2013.01)

(58) Field of Classification Search
CPC ...... B25J 9/1674; B25J 9/0084; B25J 13/006; B25J 13/086; B25J 13/088
USPC .................................. 700/245, 248; 702/188
See application file for complete search history.

(56) References Cited

U.S. PATENT DOCUMENTS

| | | | |
|---|---|---|---|
| 11,358,278 B2 * | 6/2022 | Krautwurm | B25J 9/1671 |
| 2003/0214392 A1 * | 11/2003 | Flick | B60R 25/04 |
| | | | 340/13.24 |
| 2007/0064092 A1 * | 3/2007 | Sandbeg | H04N 7/142 |
| | | | 348/14.02 |
| 2007/0183616 A1 * | 8/2007 | Wahl | H04R 1/1066 |
| | | | 381/384 |
| 2008/0065243 A1 * | 3/2008 | Fallman | G05B 23/0267 |
| | | | 700/83 |
| 2009/0079552 A1 * | 3/2009 | Flick | B60R 25/24 |
| | | | 340/426.17 |
| 2009/0180668 A1 * | 7/2009 | Jones | G06F 3/017 |
| | | | 382/104 |

FOREIGN PATENT DOCUMENTS

| | | |
|---|---|---|
| JP | 2010-58216 A | 3/2010 |
| JP | 2016-60017 A | 4/2016 |

* cited by examiner

*Primary Examiner* — Dalena Tran
(74) *Attorney, Agent, or Firm* — Maier & Maier, PLLC

(57) ABSTRACT

A robot system including a robot that is controlled by a robot controller and a wireless communication device that is worn or carried by a person present in the periphery of the robot. The wireless communication device has a sensor capable of detecting an acceleration, the wireless communication device is configured to transmit information related to the acceleration to the robot controller of the robot in a state in which the wireless communication device is not operated by the person, and the robot controller performs operation restriction of the robot when the acceleration exceeds a threshold.

10 Claims, 6 Drawing Sheets

ROBOT SYSTEM

CROSS-REFERENCE TO RELATED APPLICATIONS

This application is based on and claims priority to Japanese Patent Application No. 2019-214445 filed on Nov. 27, 2019, the content of which is incorporated herein by reference in its entirety.

FIELD

The present invention relates to a robot system.

BACKGROUND

In the related art, there is a known technology in which an emergency stop button is provided in a remote controller for remotely operating a robot. In addition, there is a known technology in which it is determined whether or not an operator is in an abnormal state on the basis of detection results of a posture sensor, an acceleration sensor or the like provided in a remote controller. For example, see Japanese Unexamined Patent Application, Publication No. 2010-58216.

In addition, there is a known glove provided with an enabling switch and an emergency stop switch. For example, see Japanese Unexamined Patent Application, Publication No. 2016-60017.

SUMMARY

A robot system according to an aspect of the present disclosure includes: a robot that is controlled by a robot controller; and a wireless communication device that is worn or carried by a person existing in the periphery of the robot, wherein the wireless communication device has a sensor capable of detecting an acceleration, the wireless communication device is configured to transmit information related to the acceleration to the robot controller of the robot in a state in which the wireless communication device is not operated by the person, and the robot controller performs operation restriction of the robot when the acceleration exceeds a threshold.

DETAILED DESCRIPTION OF THE EMBODIMENTS

Figure 1:
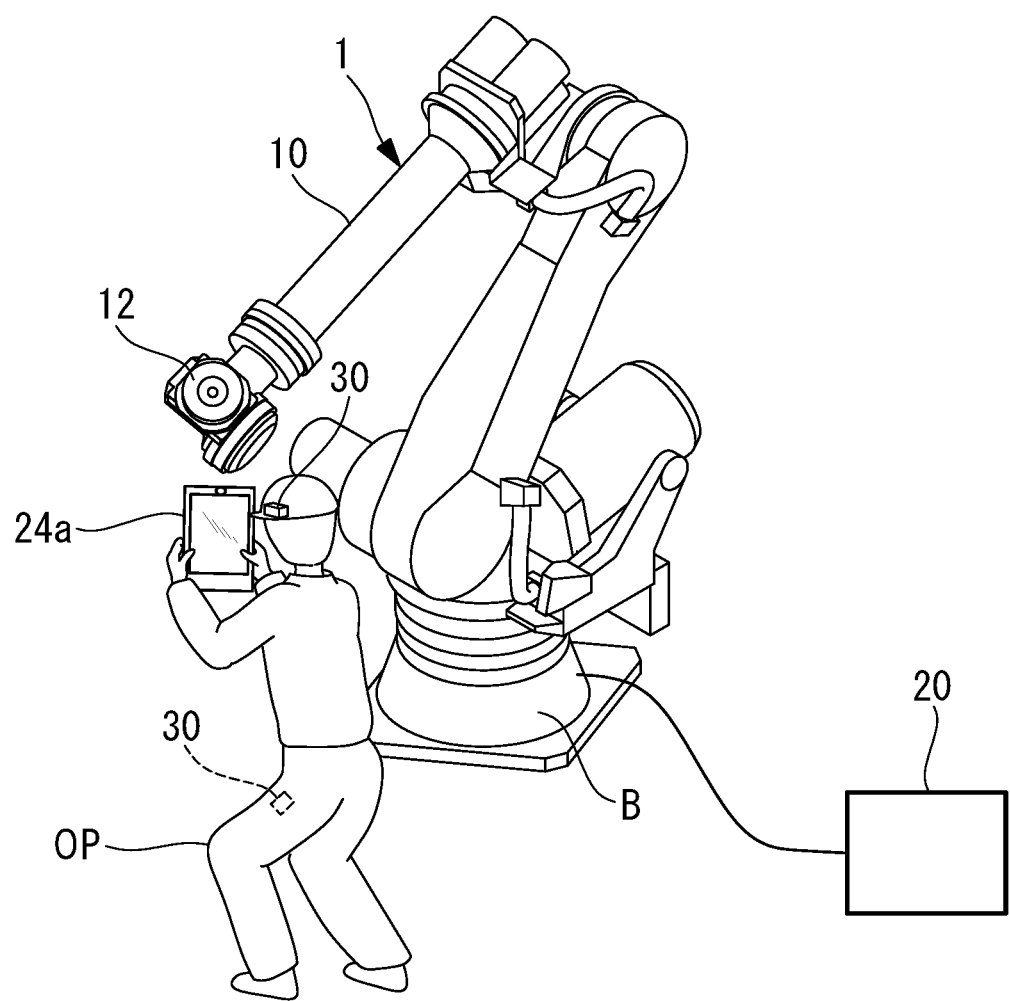
FIG. 1 is a schematic perspective view of a robot system according to an embodiment.

A robot system according to an embodiment of the present disclosure will be described below with reference to the drawings. As shown in FIG. 1, the robot system according to this embodiment includes a robot 1 and a robot controller 20 for controlling the robot 1. Various tools are attached to a wrist flange 12, which is a distal end portion of an arm 10 of the robot 1, according to the work performed by the robot 1, and the robot 1 performs the work by using one of the tools. There is also a case in which a tool is not attached to the distal end portion of the arm 10.

This robot system includes a wireless communication device 30 that is worn or carried by an operator OP who is a person present in the periphery of the robot 1. In this embodiment, the wireless communication device 30 is attached to a cap or a helmet, whereby the wireless communication device 30 is mounted on the head of the operator OP.

The arm 10 of the robot 1 includes a plurality of arm members and a plurality of joints. In addition, the arm 10 includes a plurality of servo motors that respectively drive the plurality of joints. Various servo motors, such as a rotary motor and a linear motor, may be used as the individual servo motors. Each of the servo motors has an operating position detector for detecting the operating position and the operating speed thereof, and an example of the operating position detector is an encoder. The detection values of the operating position detectors are transmitted to the robot controller 20.

Figure 2:
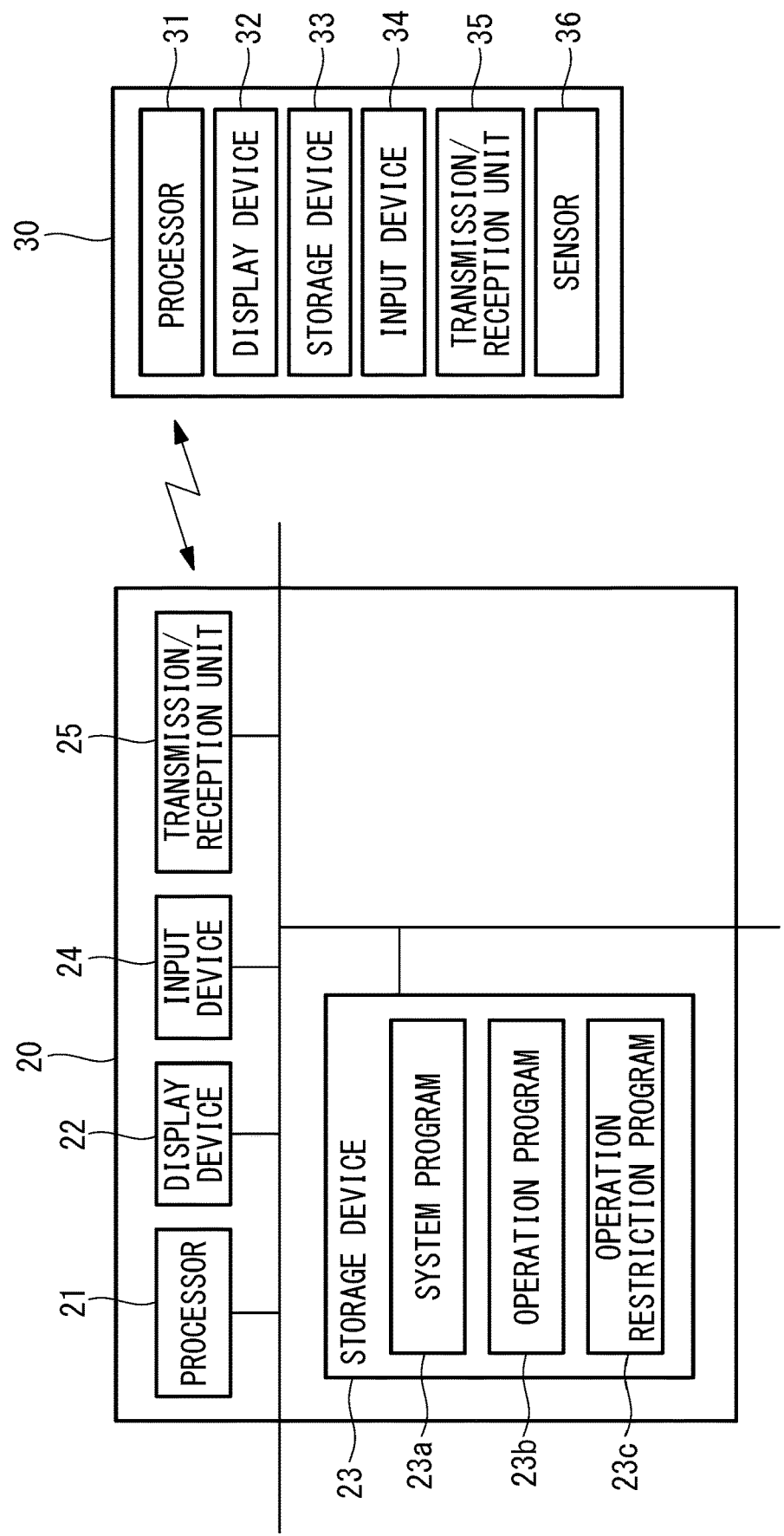
FIG. 2 is a block diagram of a robot controller and a wireless communication device according to this embodiment.

As shown in FIG. 2, the robot controller 20 includes: a processor 21, such as a CPU; a display device 22; a storage device 23 having a non-volatile storage, ROM, RAM or the like; an input device 24, which is a keyboard, a touch panel, an operation panel or the like; and a transmission/reception unit 25 for transmitting and receiving signals. The transmission/reception unit (reception unit) 25 has an antenna and performs transmission and reception of the signals by using the antenna. In addition, the input device 24 and the transmission/reception unit 25 function as input units. The robot controller 20 communicates with the wireless communication device 30 by means of short-range wireless communication. Although the robot controller 20 is provided in the robot 1 in this embodiment, the robot controller 20 may be a computer that is provided outside the robot 1 and that has the abovementioned configuration.

A system program 23a is stored in the storage device 23, and the system program 23a is responsible for the basic function of the robot controller 20. An operation program 23b is also stored in the storage device 23. The operation program 23b is created with reference to a reference coordinate system of the robot 1 and serves to sequentially place, for example, the distal end of a tool attached to the distal end portion of the arm 10, at prescribed work positions in the reference coordinate system.

The robot controller 20 has, as a portion of the input device 24, a teaching operation device 24a having a tablet computer or the like. In an example, the teaching operation device 24a has an input unit such as a touch screen, and the teaching operation device 24a is used, for example, for creation of the operation program 23b, manual operation of the arm 10 of the robot 1, and so forth (FIG. 1). In FIG. 1, the operator OP is setting the operation program 23b by using the teaching operation device 24a.

As shown in FIG. 2, the wireless communication device 30 includes: a processor 31, such as a CPU; a display device 32; a storage device 33 having a non-volatile storage, ROM, RAM or the like; an input device 34, which is a touch panel, buttons, dials, various keys or the like; and a transmission/reception unit 35 for transmitting and receiving signals. The transmission/reception unit 35 has an antenna and performs transmission and reception of the signals by using the antenna. In addition, the input device 34 and the transmission/reception unit 35 function as input units.

In an example, the transmission/reception unit 35 performs communication with the robot controller 20 by using publicly known short-range wireless communication, such as Bluetooth (registered trademark). The wireless communication device 30 includes a sensor 36 capable of detecting the acceleration. As the sensor 36, a one-axis accelerometer, a two-axis accelerometer, a three-axis accelerometer, a six-axis accelerometer, a gyro sensor or the like may be used. The gyro sensor can detect the acceleration in the tilt direction.

The wireless communication device 30 successively transmits, to the robot controller 20, the acceleration detection results from the sensor 36 as information related to the acceleration (hereinafter referred to simply as "acceleration information" in some cases) by means of the short-range wireless communication. In an example, the input device 34 is provided in the wireless communication device 30, and transmission/non-transmission of the acceleration information to the robot controller 20 is switched therebetween by the operation of the input device 34. Alternatively, transmission/non-transmission of the acceleration information to the robot controller 20 is switched in accordance with the operation of the robot controller 20.

In another example, the robot controller 20 switches reception/non-reception of the acceleration information from the wireless communication device 30 according to a distance between the wireless communication device 30 and the robot controller 20. In an example, the distance is calculated on the basis of the intensity of a signal that the robot controller 20 receives from the wireless communication device 30, or the intensity of a signal that the wireless communication device 30 receives from the robot controller 20. The robot controller 20 and the wireless communication device 30 that acquire the distance measurement results in this way function as distance measuring means.

When the robot controller 20 receives the acceleration information from the wireless communication device 30 and it is determined that the acceleration has exceeded a threshold on the basis of the received information, the robot controller 20 performs operation restriction of the robot 1, as will be described later. Note that, in this embodiment, the operation restriction of the robot 1 according to the acceleration information is enabled in the robot controller 20 receiving the acceleration information from the wireless communication device 30.

Furthermore, in another example, transmission of the acceleration information to the robot controller 20 may be started when the wireless communication device 30 enters a prescribed area. Alternatively, reception of the acceleration information by the robot controller 20 may be started when the wireless communication device 30 enters a prescribed area. For example, a plurality of antennas are arranged at the peripheral edge of a prescribed area, the robot controller 20 or the wireless communication device 30 calculates the position of the wireless communication device with respect to the individual antennas, and it is determined whether or not the wireless communication device 30 has entered the prescribed area.

An operation restriction program 23c is stored in the storage device 23. When the detection result received from the wireless communication device 30 exceeds a prescribed reference, the robot controller 20 performs operation restriction of the arm 10, for example, stopping the arm 10, reducing the operating speed of the arm 10, and so forth. For example, the robot controller 20 performs operation restriction of the arm 10, when the magnitude of the acceleration detected by the sensor 36 has exceeded a prescribed value, or when the magnitude of the acceleration in a prescribed direction has exceeded a prescribed value.

In the case in which the wireless communication device 30 is attached, in advance, to a cap, a helmet, a head band or the like, the direction of each axis of the sensor 36, which is an accelerometer, can be roughly made to correspond to a vertical direction, a horizontal direction, etc. Thus, for example, it is possible to perform operation restriction of the arm 10 according to the acceleration in the vertical direction.

Also in the case in which the wireless communication device 30 is attached, in advance, to a label tag, a name plate, a band or the like attached to the chest, shoulder, abdomen, back, waist, or hip of the operator OP, the direction of each axis of the sensor 36, which is an accelerometer, can be roughly made to correspond to a vertical direction, a horizontal direction, etc.

In the case in which the wireless communication device 30 is mounted on the head of the operator OP, a large acceleration tends to be detected by the sensor 36, when the operator OP unintentionally loses his/her balance, or when the operator OP is surprised. Also in the case in which the wireless communication device 30 is mounted on the chest, shoulder, or back, there is a tendency similar to the case in which the wireless communication device 30 is mounted on the head. Also in the case in which the wireless communication device 30 is mounted on the waist or hip, a distinctive acceleration tends to be detected by the sensor 36, when the operator OP unintentionally loses his/her balance, or when the operator OP is surprised.

The wireless communication device 30 may be carried by the operator OP. For example, as shown in FIG. 1, the wireless communication device 30 may be carried by the operator OP by placing the wireless communication device 30 in a chest pocket, a trouser pocket or the like of the clothes of the operator OP. In the case in which the wireless communication device 30 is worn or carried by the operator OP as described above, the operator OP does not need to hold the wireless communication device 30 in his or her hand. In other words, the wireless communication device 30 transmits the acceleration information to the robot controller 20 in a state in which the wireless communication device 30 is not operated by the operator OP. Thus, the operator OP can use both hands for the operation of the teaching operation device 24a, the operation of the input device 24, or the like without any inconveniences.

Note that the wireless communication device 30 may determine whether or not to perform operation restriction of the arm 10, and the wireless communication device 30 may transmit, to the robot controller 20, a signal for causing the operation restriction as the acceleration information. Note that the signal for causing the operation restriction is a type of signal indicating that the acceleration has exceeded a threshold.

Figure 3:
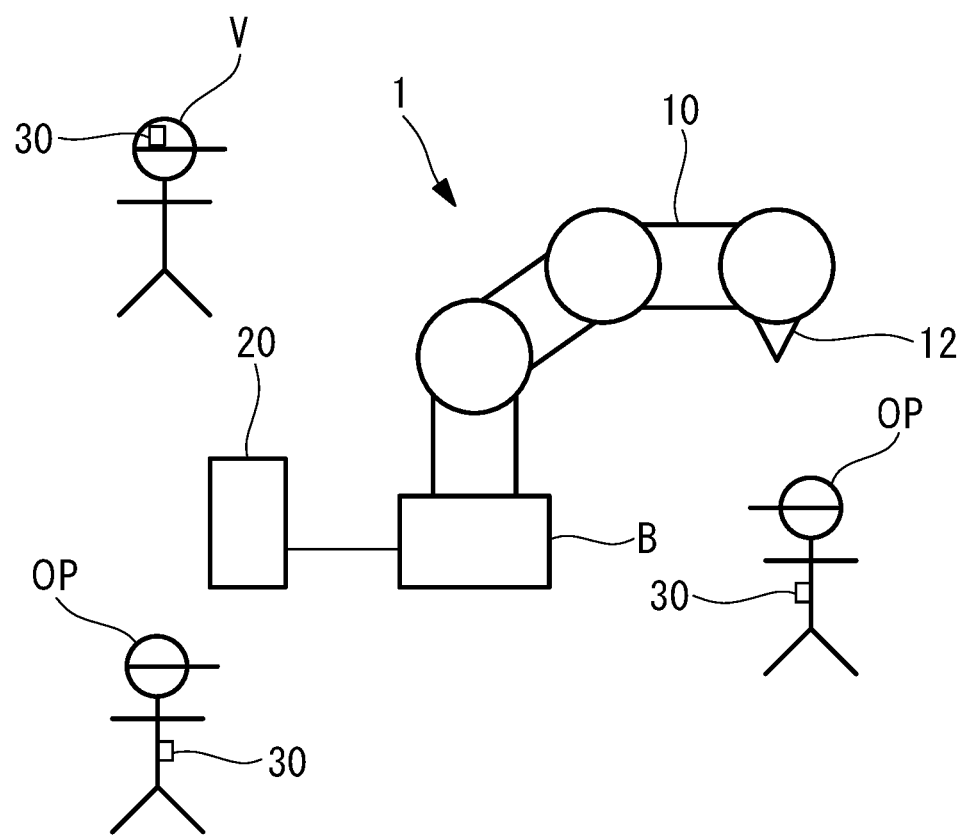
FIG. 3 is a schematic diagram of a first modification of this embodiment.

In addition, as shown in FIG. 3, in the case in which a plurality of persons, such as operators OP and visitors V, are present in the periphery of the robot 1, the plurality of persons may respectively wear or carry the wireless communication devices 30. In this case, the plurality of wireless communication devices 30 transmit the acceleration information to the robot controller 20. Then, if the acceleration information indicating that operation restriction of the arm 10 should be performed is transmitted to the robot controller 20 from any one of the wireless communication devices 30, the robot controller 20 performs the operation restriction of the arm 10.

Figure 4:
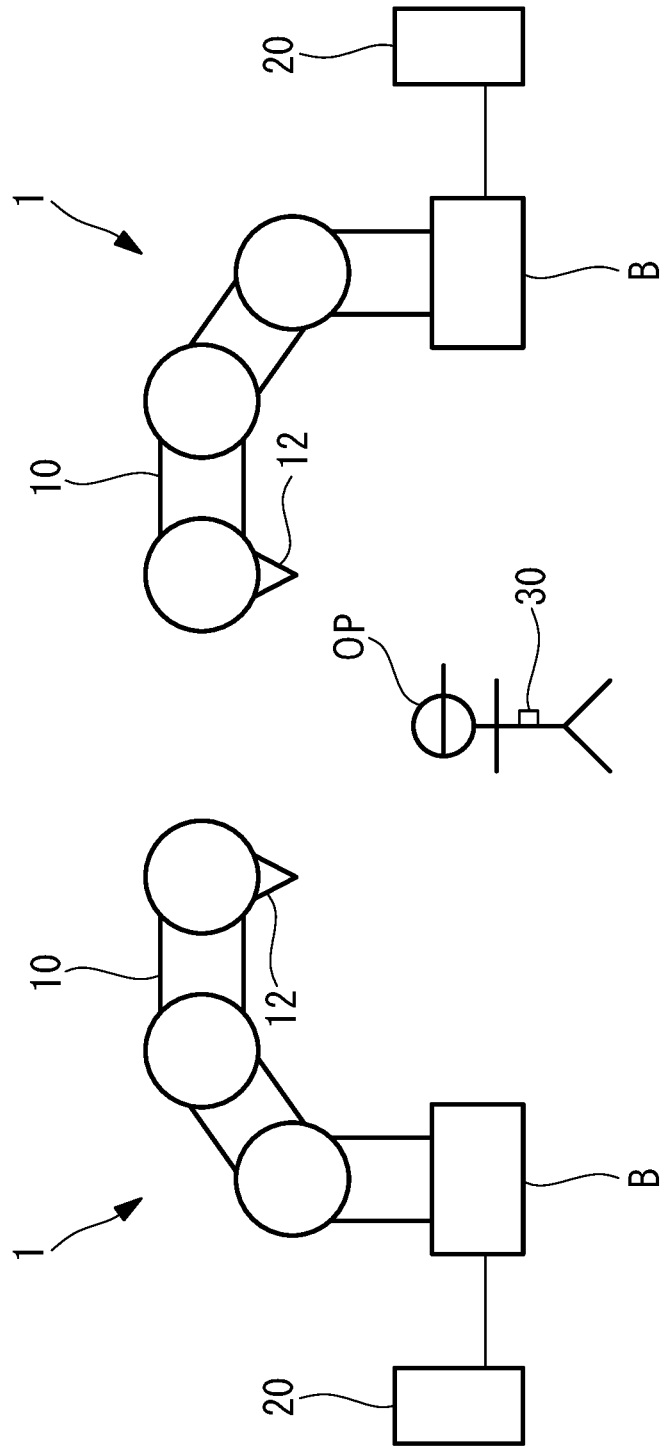
FIG. 4 is a schematic diagram of a second modification of this embodiment.

In addition, as shown in FIG. 4, in the case in which a plurality of robots 1 are present in a prescribed area and one or a plurality of persons are present in the periphery of the plurality of robots 1, the acceleration information may be respectively transmitted to the robot controllers 20 of the plurality of robots 1 from the wireless communication device 30. For example, in FIG. 4, if the acceleration information indicating that operation restriction of the arms 10 should be performed is transmitted to the robot controllers 20 from the wireless communication device 30 of the operator OP, the robot controllers 20 perform the operation restriction of the arms 10. Note that, in the aspect shown in FIG. 4, thresholds for performing operation restriction, which are respectively set in the plurality of robots 1, may be different from each other.

Figure 5:
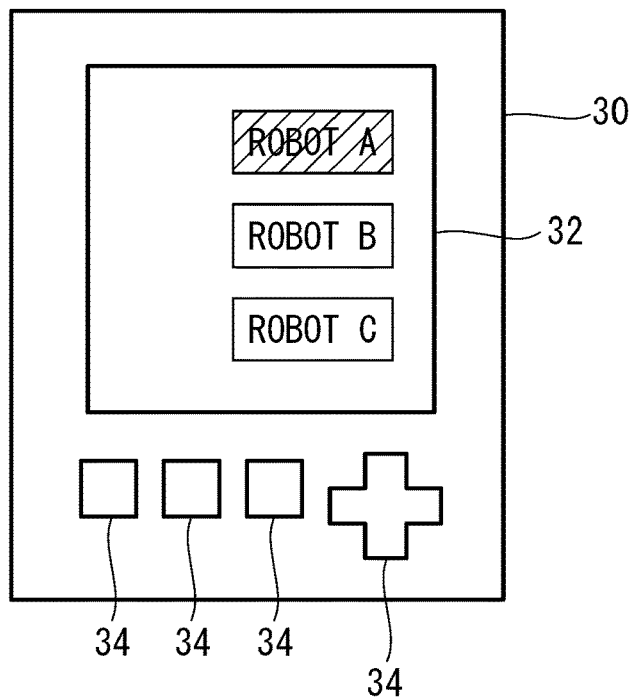
FIG. 5 is a schematic front view of the wireless communication device according to this embodiment.

In the abovementioned configuration, as shown in FIG. 5, the robot 1 to which the acceleration information is to be transmitted may be displayed on the display device 32 of the wireless communication device 30. In the case of FIG. 5, the robot 1 to which the acceleration information is to be transmitted is indicated by hatched lines.

Figure 6:
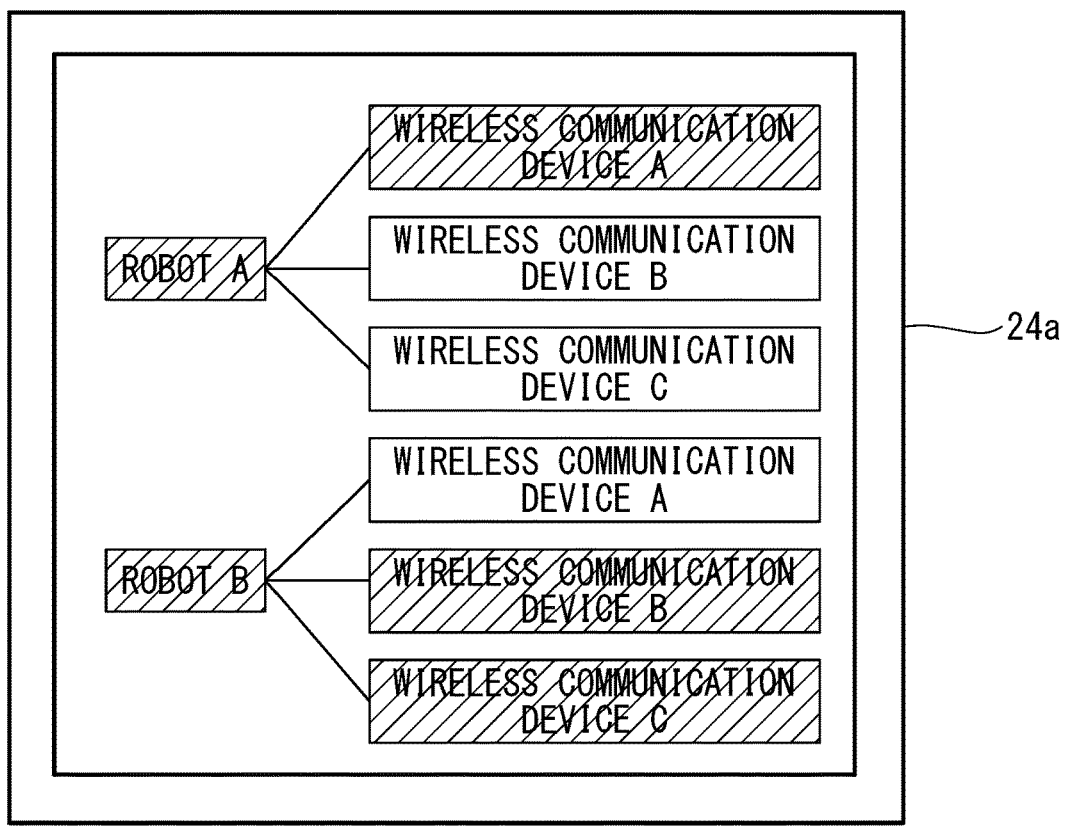
FIG. 6 is a schematic front view of a teaching operation device according to this embodiment.

In addition, in the abovementioned configuration, a single robot 1 or a plurality of robots 1 may be shown on the display device 22 of the robot controller 20, a display device of the teaching operation device 24a, or a display device of another computer, and the wireless communication devices 30 that are set to transmit the acceleration information to the individual robots 1 may be displayed thereon. For example, as shown in FIG. 6, two robots 1 and the wireless communication devices 30 that are set to transmit the acceleration information to the individual robots 1 are displayed on the display device of the teaching operation device 24a. In the case of FIG. 6, the wireless communication devices 30 that transmit the acceleration information are indicated by hatched lines.

For example, in the case of FIG. 5, the operator OP can set the robot 1 to which the acceleration information is to be transmitted, by the operation of the input device 34 or the like. In this case, the wireless communication device 30 functions as a setting means for switching enabling/disabling of operation restriction of the robot 1 in the robot controller 20.

In addition, in the case of FIG. 6, the operator can set the robots 1 to which the acceleration information is to be transmitted from each of the wireless communication devices 30, by the operation of the touch screen of the teaching operation device 24a. In this case, the teaching operation device 24a functions as a setting means for switching between enabling/disabling of operation restriction of the robot 1 in the robot controller 20. The setting may be performed by using the display device 22 and the input device 24, or may be performed by using another computer. In this way, when the setting is performed with a device other than the wireless communication device 30, a person wearing the wireless communication device 30 cannot change the setting. Such a configuration is advantageous for improving the safety of a person in the periphery of the robot 1.

Figure 7:
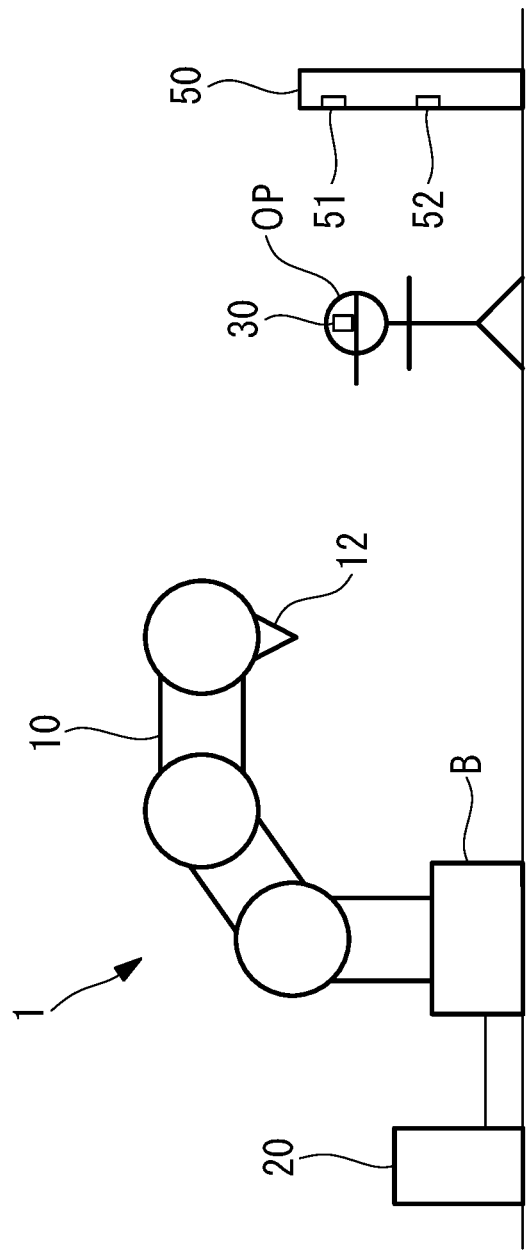
FIG. 7 is a schematic diagram of a third modification of this embodiment.

In addition, in the abovementioned configuration, as shown in FIG. 7, a height detection device 50 for detecting the height position of the wireless communication device 30 may be provided. The height detection device 50 includes, for example, a first antenna 51 and a second antenna 52 provided at a lower position than the first antenna 51. The individual antennas 51, 52 transmit signals (detection results) related to the intensities of the signals received from the wireless communication device 30 to the robot controller 20, the wireless communication device 30, another computer or the like. Upon reception of the signals, the robot controller 20, the wireless communication device 30, another computer or the like can determine the height position of the wireless communication device 30 according to the intensities of the signals from the individual antennas 51, 52.

In addition, the robot controller 20 may change the acceleration threshold for performing operation restriction of the arm 10 according to the detection results of the individual antennas 51, 52, in other words, the height position of the wireless communication device 30. For example, when the wireless communication device 30 is disposed at a lower position than the second antenna 52, the robot controller 20 lowers the acceleration threshold for performing operation restriction of the robot 1. In the case in which it is determined that the wireless communication device 30 is mounted at a high position on the operator OP, such as the head, chest, or shoulder, it is likely that the reduction in height of the wireless communication device 30 indicates that the operator OP is crouching or has fallen down. In such a case, the operator OP can work more safely if the acceleration threshold is set to be lower than usual.

In the abovementioned embodiment, the acceleration information is transmitted to the robot controller 20 from the wireless communication device 30 in a state in which the wireless communication device 30 is not operated by the operator OP. With this configuration, it is possible to realize a situation in which the operation restriction of the robot 1 is reliably performed by the robot controller 20 at appropriate timing.

In addition, in the abovementioned embodiment, the wireless communication device 30 transmits the acceleration information to the plurality of robot controllers 20. This configuration is advantageous for securing the safety of a person in the periphery of the robot 1, for example, in a welding line or the like employing a plurality of robots 1. In addition, in the abovementioned embodiment, the plurality of wireless communication devices 30 transmit the acceleration information to the robot controller 20. With this configuration, even in the case in which a plurality of persons are present in the periphery of a single or a plurality of robots 1, it is possible to secure the safety of each person.

In addition, in the abovementioned embodiment, it is possible to switch between enabling/disabling of operation restriction of the robot 1 in the robot controller 20 by using the wireless communication device 30. With this configuration, it is possible to reliably grasp the wireless communication device 30 used for operation restriction of the robot 1.

In addition, in the abovementioned embodiment, it is possible to switch between enabling/disabling of operation restriction of the robot 1 in the robot controller 20 by using the robot controller 20, another computer or the like. This configuration is advantageous for securing the safety of a person in the periphery of the robot 1, because the switching is not performed with the wireless communication device 30.

Note that the antenna of the transmission/reception unit 25 may be provided on the arm 10 of the robot 1. In this case, the acceleration signal from the wireless communication device 30 is received by said antenna. This configuration is advantageous for accurately measuring the distance between the arm 10 and the wireless communication device 30. The same effect may be afforded in the case in which the antenna is provided on a base B (FIG. 1) of the robot 1.

In addition, in the abovementioned embodiment, the distance between the robot 1 and the wireless communication device 30 may be measured, and the robot controller 20 may determine whether or not to perform the operation restriction according to the measured distance. With this configuration, unnecessary operation restriction is prevented, and this leads to an increase in the efficiency of work performed by the robot 1.

In the abovementioned embodiment, the robot 1 may be a collaborative robot that cooperates with a person. With the collaborative robot, the operation restriction is performed to prevent harm to a person, for example, when the robot comes into contact with a person; however, if the acceleration information is transmitted to the robot 1 from the wireless communication device 30, as described above, the safety of a person in the periphery of the robot 1 is further improved.

The invention claimed is:

1. A robot system comprising:
    a robot that is controlled by a robot controller; and
    a wireless communication device that is worn or carried by a person in a periphery of the robot,
    wherein the wireless communication device has a sensor capable of detecting an acceleration,
    the wireless communication device is configured to transmit information related to the acceleration to the robot controller of the robot in a state in which the wireless communication device is not operated by the person, and
    the robot controller performs operation restriction of the robot when the acceleration exceeds a threshold.

2. The robot system according to claim 1, wherein:
    a plurality of the robots are in a prescribed area;
    the wireless communication device is configured to transmit the information to the robot controllers of the plurality of robots in the state in which the wireless communication device is not operated by the person; and
    the robot controller of each of the robots performs the operation restriction of the robot when the acceleration exceeds the threshold.

3. The robot system according to claim 1, wherein:
    a plurality of wireless communication devices are respectively worn or carried by a plurality of persons;
    each of the wireless communication devices in the plurality of wireless communication devices is configured to transmit the information to the robot controller of the robot in the state in which the wireless communication device is not operated by the person; and
    the robot controller performs the operation restriction of the robot when the acceleration exceeds the threshold.

4. The robot system according to claim 1, wherein the wireless communication device is mounted on one of a head, chest, shoulder, abdomen, back, waist, or hip of the person.

5. The robot system according to claim 1, further comprising a height detection device that detects a height position of the wireless communication device,
    wherein the robot controller changes the threshold according to a detection result of the height detection device.

6. The robot system according to claim 1, wherein the wireless communication device transmits, to the robot controller, a signal indicating that the acceleration has exceeded a threshold as the information related to the acceleration.

7. The robot system according to claim 1, further comprising a setting means for switching enabling/disabling of the operation restriction of the robot in the robot controller.

8. The robot system according to claim 7, wherein the setting means can set, among a plurality of robots, a robot to which the wireless communication device does not transmit the information.

9. The robot system according to claim 1, wherein:
    the robot includes a reception unit that receives the information; and
    the reception unit is attached to an arm or a base of the robot.

10. The robot system according to claim 1, further comprising a distance measuring unit which measures a distance between the robot and the wireless communication device,
    wherein the robot controller determines whether or not to perform the operation restriction in response to a measurement result of the distance measuring means.

* * * * *